United States Patent [19]

Berman et al.

[11] Patent Number: 4,604,317

[45] Date of Patent: Aug. 5, 1986

[54] CURABLE COMPOSITIONS CONTAINING A POLYEPOXIDE AND A HALOGENATED BISPHENOL

[75] Inventors: Jody R. Berman; Christine C. Berkefelt; Dale J. Aldrich, all of Lake Jackson, Tex.

[73] Assignee: The Dow Chemical Company, Midland, Mich.

[21] Appl. No.: 737,591

[22] Filed: May 24, 1985

Related U.S. Application Data

[63] Continuation-in-part of Ser. No. 658,083, Oct. 5, 1984, abandoned.

[51] Int. Cl.$^4$ ............................................. C08G 59/08
[52] U.S. Cl. ....................... 428/285; 428/273; 523/400; 525/482; 525/505; 525/507; 525/523; 528/90; 528/98; 528/99; 528/102
[58] Field of Search ............... 528/98, 99, 102, 90; 428/413, 418, 416, 285, 273; 525/523, 482, 505, 507; 523/400

[56] References Cited

U.S. PATENT DOCUMENTS

| | | | |
|---|---|---|---|
| 3,264,369 | 8/1966 | Ephraim | 525/486 |
| 3,268,619 | 8/1966 | Nametz | 525/482 |
| 3,280,216 | 10/1966 | Partansky | 528/98 X |
| 3,329,737 | 7/1967 | Smith | 525/490 |
| 3,367,990 | 2/1968 | Bremmer | 525/482 |
| 3,493,630 | 2/1970 | Salensky | 525/489 |
| 3,787,451 | 1/1974 | Mah | 528/98 X |
| 3,931,109 | 1/1976 | Martin | 525/507 |
| 4,322,456 | 3/1982 | Martin | 427/195 |
| 4,394,496 | 1/1983 | Schrader | 528/98 |

*Primary Examiner*—Earl Nielsen
*Attorney, Agent, or Firm*—J. G. Carter

[57] ABSTRACT

Curable compositions are disclosed which comprise a polyglycidyl ether such as the triglycidylether of tris(-hydroxyphenyl)methane and a halogenated dihydric phenol such as tetrabromobisphenol A. These compositions can be cured by heating in the presence or absence of catalyst for reacting epoxy groups with phenolic hydroxyl groups such as 2-methyl imidazole. These compositions are particularly useful in the preparation of electrical laminates.

48 Claims, No Drawings

CURABLE COMPOSITIONS CONTAINING A POLYEPOXIDE AND A HALOGENATED BISPHENOL

CROSS REFERENCE TO RELATED APPLICATION

This is a continuation-in-part application of copending application Ser. No. 658,083 filed Oct. 5, 1984, now abandoned.

BACKGROUND OF THE INVENTION

The present invention pertains to curable compositions containing polyglycidyl ethers of a polyphenol and halogenated bisphenols.

Compositions containing glycidyl ethers of bisphenols and halogenated bisphenols have been employed in the preparation of electrical laminates. However, they are usually lacking in one or more properties such as thermal performance, moisture resistance and high temperature mechanical strength and the like.

The present invention provides a curable composition which results in cured compositions having an improvement in one or more of the properties selected from thermal stability, glass transition temperature, elevated temperature mechanical strength, moisture resistance, chemical resistance and toughness and the like.

SUMMARY OF THE INVENTION

The present invention pertains to a composition comprising (A) at least one of
(1) at least one epoxy resin represented by formula I, II, III, IV, V or VI wherein each A and A' is independently a divalent hydrocarbyl group having from 1 to about 12 carbon atoms,

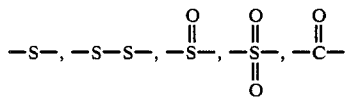

or —O—; each B is represented by the formula

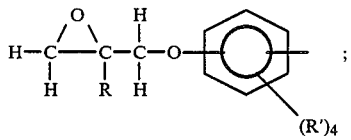

each B' is represented by the formula

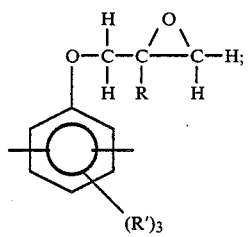

each B" is represented by the formula

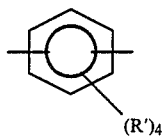

each R is independently hydrogen or an alkyl group having from 1 to about 4 carbon atoms; each Q is independently hydrogen or a hydrocarbyl group having from 1 to about 10 carbon atoms; each R' is independently hydrogen, a hydrocarbyl or hydrocarbyloxy group having from 1 to about 10 carbon atoms or a halogen; m has a value of n'−1; m' has a value of n'−1; m" has a value of n"−1; each n, n' and n" independently has a value from zero to about 3; q has a value from zero to about 4; each y independently has an average value from 1 to about 5; y' has an average value of from zero to about 3 and each z and z' independently has a value from zero to about 3;

(2) the reaction product of
(a) at least one epoxy resin represented by formula (I) as defined in component (A-1); and
(b) at least one dihydric phenol represented by formulas VII or VIII wherein A is a divalent hydrocarbon group having from 1 to about 12 carbon atoms,

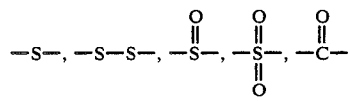

or —O—; each Y is independently hydrogen, a halogen or a hydrocarbyl or hydrocarbyloxy group having from 1 to about 10 carbon atoms; and n has a value of zero or 1; and wherein components (a) and (b) are present in quantities such that the ratio of phenolic hydroxyl groups to epoxide groups is from about 0.01:1 to about 0.5:1, preferably from about 0.05:1 to about 0.25:1, most preferably from about 0.1:1 to about 0.2:1; or (3) mixtures thereof; and (B) at least one halogenated dihydric phenol represented by formulas IX or X wherein A is a divalent hydrocarbyl group having from 1 to about 12, preferably from 1 to about 6 carbon atoms,

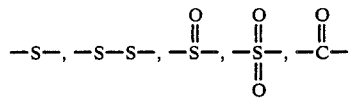

or —O—; each X is a halogen, preferably bromine; each Y is independently hydrogen, a halogen or a hydrocarbyl or hydrocarbyloxy group having from 1 to about 10 carbon atoms; and n has a value of zero or 1; and wherein components (A) and (B) are present in quantities such that the ratio of phenolic hydroxyl groups to epoxide groups is from about 0.7:1 to about 1.1:1, preferably from about 0.85:1 to about 1:1, most preferably from about 0.9:1 to about 0.95:1.

Another aspect of the present invention pertains to a composition comprising (A) at least one of
(1) at least one epoxy resin represented by formulas I, II, III, IV, V or VI wherein each A and A' is independently a divalent hydrocarbyl group having from 1 to about 12 carbon atoms,

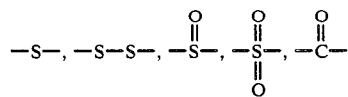

or —O—; each B is represented by the formula

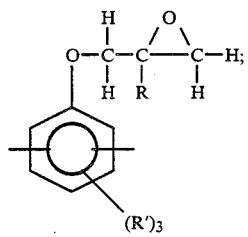

B' is represented by the formula

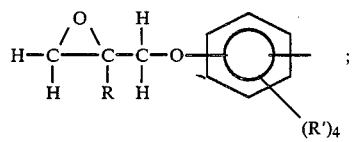

each B" is represented by the formula

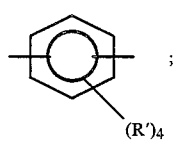

each R is independently hydrogen or an alkyl group having from 1 to about 4 carbon atoms; each Q is independently hydrogen or a hydrocarbyl group having from 1 to about 10 carbon atoms; each R' is independently hydrogen, a hydrocarbyl or hydrocarbyloxy group having from 1 to about 10 carbon atoms or a halogen; m has a value of n−1; m' has a value of n'−1; m" has a value of n"−1; each n, n' and n" independently has a value from zero to about 3; q has a value from zero to about 4; each y independently has an average value from 1 to about 5; y' has an average value of from zero to about 3 and each z and z' independently has a value from zero to about 3;

(2) the reaction product of
(a) at least one epoxy resin represented by formulas I, II, III, IV, V or VI and
(b) at least one dihydric phenol represented by the formulas VII or VIII wherein A is a divalent hydrocarbon group having from 1 to about 12 carbon atoms,

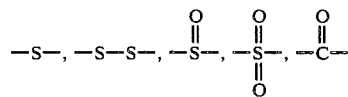

or —O—; each Y is independently hydrogen, a halogen or a hydrocarbyl or hydrocarbyloxy group having from 1 to about 10 carbon atoms; and n has a value of zero or 1; and wherein components (a) and (b) are present in quantities such that the ratio of phenolic hydroxyl groups to epoxide groups is from about 0.01:1 to about 0.5:1, preferably from about 0.05:1 to about 0.25:1, most preferably from about 0.1:1 to about 0.2:1; or (3) mixtures thereof;

(B) at least one halogenated dihydric phenol represented by formulas IX or X wherein A is a divalent hydrocarbon group having from 1 to about 12 carbon atoms,

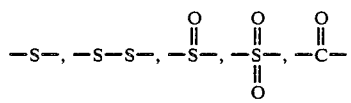

or —O—; each X is a halogen, preferably bromine; each Y is independently hydrogen, a halogen or a hydrocarbyl or hydrocarbyloxy group having from 1 to about 10 carbon atoms with the proviso that at least one X or Y is a halogen; and n has a value of zero or 1;

(C) an effective quantity of at least one catalyst for effecting the reaction between components (A) and (B); and (D) from zero to about 50, preferably from about 10 to about 45, most preferably from about 30 to about 40, percent by weight of the combined weight of components (A), (B), (C) and (D) of at least one solvent; and wherein components (A) and (B) are present in quantities such that the ratio of phenolic hydroxyl groups to epoxide groups is from about 0.7:1 to about 1.1:1, preferably from about 0.85:1 to about 1:1, most preferably from about 0.9:1 to about 0.95:1.

The present invention also pertains to substrates impregnated with the aforementioned compositions and to laminates prepared therefrom.

FORMULA I

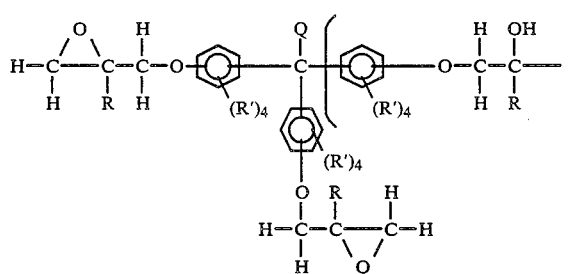

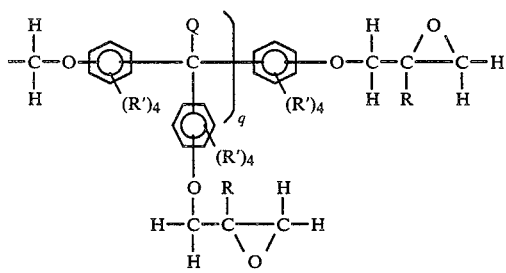

FORMULA II
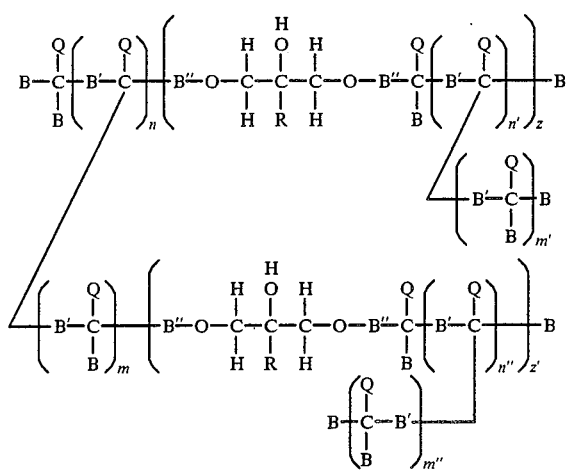

FORMULA III
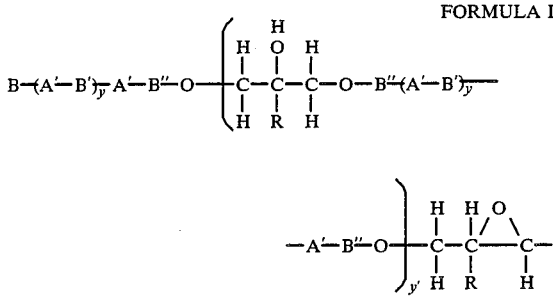

FORMULA IV
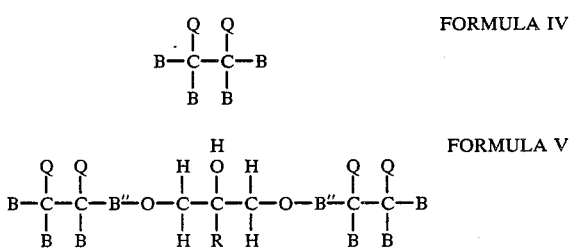

FORMULA V
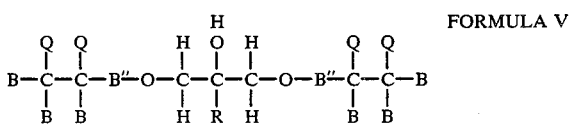

FORMULA VI
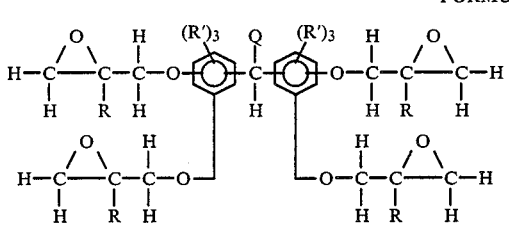

FORMULA VII
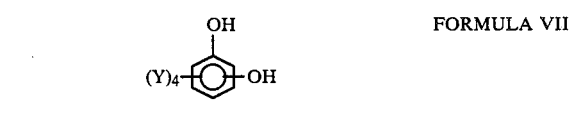

FORMULA VIII
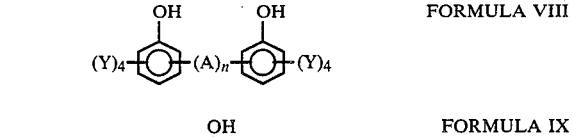

FORMULA IX
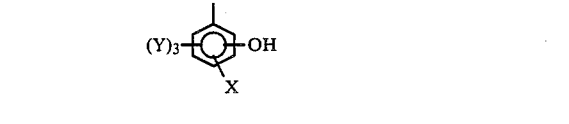

FORMULA X
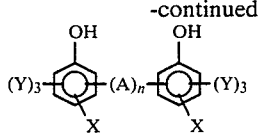

DETAILED DESCRIPTION OF THE PRESENT INVENTION

Particularly suitable epoxy resins which can be employed herein include, for example, the triglycidyl ether of tris(hydroxyphenyl)methane, higher molecular weight homologs thereof, trisepoxides advanced with dihydric phenols, phenol-formaldehyde epoxy novolac resins, cresol-formaldehyde epoxy novolac resins, resorcinol-formaldehyde epoxy novolac resins, phenol-glyoxal epoxy novolac resins, mixtures thereof and the like.

Also suitable as an epoxy resin herein are those glycidyl ethers of phenol-aldehyde novolac resins wherein at least a portion of the two functional material has been removed. These epoxy resins are disclosed by Bertram et al in a copending application Ser. No. 690,702 filed Jan. 11, 1985 which is incorporated herein by reference.

Particularly suitable dihydric phenols and halogenated dihydric phenols include, for example, bisphenol A, tetrabromobisphenol A, bisphenol S, tetrabromobisphenol S, biphenol, tetrabromobiphenol, tetrabromodihydroxybenzophenone, resorcinol, tetrabromoresorcinol, mixtures thereof and the like.

Multifunctional phenolic compounds, those having an average functionality of greater than 2, can be employed in this invention together with the diphenolic compounds, if desired, so as to change the cure behavior of the composition. Particularly suitable multifunctional phenolic compounds include, for example, phenol-formaldehyde condensation products having an average functionality of from about 3 to about 8, phenol-hydroxybenzaldehyde condensation products having an average functionality from of about 3 to about 7 and cresol-formaldehyde condensation products having an average functionality of from about 3 to about 8.

Suitable catalysts for effecting the reaction between the epoxy resin and the phenolic hydroxyl-containing compound include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216; 4,302,574; 4,320,222; 4,358,578; 4,366,295; and 4,389,520, all of which are incorporated herein by reference.

Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), ethyltriphenylphosphonium tetrahaloborate, tetrabutylphosphonium chloride, tetrabutylphosphonium acetate, tetrabutylphosphonium diacetate (tetrabutylphosphonium acetate.acetic acid complex), tetrabutylphosphonium tetrahaloborate, butyltriphenylphosphonium tetrabromobisphenate, butyltriphenylphosphonium bisphenate, butyltriphenylphosphonium bicarbonate, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, and mixtures thereof and the like.

Other suitable catalysts include tertiary amines such as, for example, triethylamine, tripropylamine, tributylamine, 2-methylimidazole, benzyldimethylamine, mixtures thereof and the like.

Other suitable catalysts include ammonium compounds such as, for example, triethylammonium chloride, triethylammonium bromide, triethylammonium iodide, triethylammonium tetrahaloborate, tributylammonium chloride, tributylammonium bromide, tributylammonium iodide, tributylammonium tetrahaloborate, N,N'-dimethyl-1,2-diaminoethane.tetrahaloboric acid complex, and mixtures thereof and the like.

Other suitable catalysts include quaternary and tertiary ammonium phosphonium, and arsonium adducts or complexes with suitable non-nucleophilic acids such as, for example, fluoboric, fluoarsenic, fluoantimonic, fluophosphoric, perchloric, perbromic, periodic, mixtures thereof and the like.

Suitable solvents which can be employed herein include, for example, ketones, alcohols, glycol ethers and amides, such as, for example, acetone, methyl ethyl ketone, methanol, propylene glycol mono methyl ether and dimethyl formamide.

The compositions of the present invention may also contain, if desired, stabilizers, pigments, dyes, mold release agents, flow control agents, reinforcing agents, fillers, fire retardant agents, rubber modifiers, surfactants, accelerators, reactive diluents, mixtures thereof and the like.

Suitable stabilizers which can be employed herein include, for example those represented by the formula

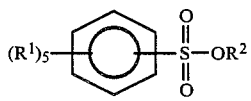

XI.

wherein each $R^1$ is independently hydrogen, a hydrocarbyl group having from 1 to about 10 carbon atoms or a halogen and $R^2$ is a hydrocarbyl group having from 1 to about 10 carbon atoms.

Particularly suitable stabilizers include, for example, methyl p-toluene sulfonate, ethyl p-toluene sulfonate, methyl chlorobenzene sulfonate, combinations thereof and the like.

The stabilizer component, when used, can be employed in any suitable quantity; however, the usual quantity is from about 0.001 to about 10, preferably from about 0.01 to about 2 percent by weight based upon the weight of the epoxy resin component.

The compositions of the present invention are suitable for such applications as structural or electrical laminates or composites, coatings, adhesives, castings, moldings, electronic encapsulations and in potting compositions.

Suitable substrates which can be employed herein include, for example, fibers or filaments in woven, matt or non-woven form of glass, carbon, graphite, synthetic fibers, quartz, combinations thereof and the like.

The following examples are illustrative of the invention but are not to be construed as to limiting the scope thereof in any manner.

FRACTURE TOUGHNESS MEASUREMENT ($G_{1C}$)

The method for measuring $G_{1C}$ (fracture toughness or "critical strain energy release rate") is an adaptation of ASTM E-399 for plastics materials from the original usage with metals. The compact tension test is now widespread in usage and is described in the *J. Mater. Sci.*, Vol. 16, 2657, 1981. An individual test piece is cut as an approximate 1" (25.4 mm) square from a flat casting usually of ⅛" (3.175 mm) thickness. A dovetail notch is cut into one edge, centered, about ¼" (6.25 mm) in depth. Next, a razor blade is inserted into this notch and tapped to produce a precrack. Two holes are then drilled adjacent to the dovetail as indicated in ASTM E-399, allowing the test piece to be pinned into position in the Instron test machine. Extension of the sample now allows the force required to propagate opening of the precrack to be measured, using a test speed of 0.02 inches/minute (0.0085 mm/sec.). This force is used in the equation given in ASTM E-399, along with the required sample dimensions and actual precrack length, to calculate a "stress intensification factor" $K_Q$. This is then combined with the tensile modulus and Poisson's ratio for the material to give the value for $G_{1C}$, usually reported in ergs/cm$^2 \times 10^6$. A scale comparing typical values for $G_{1C}$ for various plastics and metals is given in reference Lee, L. H., "Physicochemical Aspects of Polymer Surfaces", K. L. Mittal, ed. Plenum Press, New York, N.Y., 1983.

The Tg was determined by Differential Scanning Calorimetry using a calibrated DuPont Instrument (Model No. 912 with a 1090 controller). Samples were run under a nitrogen atmosphere with a heat-up rate of 10° C. per min. (0.1667° C./sec.).

Coefficient of thermal expansion (CTE) was determined using a calibrated DuPont Thermal Mechanical Analyzer (Model No. 943 with a 1090 controller).

Decomposition properties were determined using a DuPont Thermal Gravimetric Analyzer (Model No. 951 with a DuPont 1090 controller).

Dynamic mechanical properties were measured on a DuPont Dynamic Mechanical Analyzer (Model No. 982 with a DuPont 1090 controller).

The following components were employed in the Examples and Comparative Experiments.

Epoxy Resin A was a polyglycidyl ether of a phenolhydroxybenzaldehyde condensation product having an EEW of 220 and an average functionality of about 3.5.

Epoxy Resin B was a polyglycidyl ether of a phenolhydroxybenzaldehyde condensation product having an EEW of 162 and an average functionality of 3.2.

Epoxy Resin C was an advanced epoxy resin made by advancing Epoxy Resin B with tetrabromobisphenol A to an EEW of 215.

Epoxy Resin D was a polyglycidyl ether of a phenolhydroxybenzaldehyde condensation product having an EEW of 204 and an average functionality of about 3.4.

Epoxy Resin E was an advanced epoxy resin made by advancing Epoxy Resin B with tetrabromobisphenol A to an EEW of 239.

Epoxy Resin F was a polyglycidyl ether of a dimethyl phenol-hydroxybenzaldehyde condensation product having an EEW of 185 and an average functionality of about 3.

Epoxy Resin G was a polyglycidyl ether of a dimethyl phenol-dimethylbenzaldehyde condensation product having an EEW of 189 and an average functionality of about 3.

Epoxy Resin H was a phenol-formaldehyde epoxy novolac resin having an average functionality of 3.6 and an EEW of about 178.

Epoxy Resin I was a phenol-formaldehyde epoxy novolac resin having an average functionality of 5.6 and an EEW of about 203.

Epoxy Resin J was a brominated phenol-formaldehyde epoxy novolac resin having an average functionality of about 3.5, an EEW of about 285 and a total percent bromine of about 36.

Epoxy Resin K was a phenol-formaldehyde epoxy novolac resin having an average functionality of about 6, containing about 1 percent two functional component and having an EEW of about 185 (the epoxy was made from an extracted 91 melt point novolac).

Epoxy Resin L was a cresol-formaldehyde epoxy novolac resin having an average functionality of about 3.5 and an EEW of about 211.

Epoxy Resin M was a cresol-formaldehyde epoxy novolac resin having an average functionality of about 5 and EEW of about 211.

Epoxy Resin N was a cresol-formaldehyde epoxy novolac resin having an average functionality of about 7.5 and an EEW of about 210.

Epoxy Resin O was a phenol/glyoxal epoxy novolac resin having an average functionality of about 4.2 and an EEW of about 231.

EXAMPLE 1

56.87 grams (0.209 equiv.) of tetrabromobispheno A (TBBPA) was stirred into 50 grams (0.227 equiv.) of Epoxy Resin A at 150° C. until the TBBPA had completely dissolved (about 180 seconds). Then 0.214 g of a 70% methanol solution of tetrabutylphosphonium acetate.acetic acid complex was added and mixed. The solution was then degassed. The resultant mixture was then poured into an aluminum mold which had been treated with Fluoroglide release agent and which had been preheated to about 175° C. The mold was clamped together at $\frac{1}{8}''$ (3.175 mm) spacing. The filled mold was then placed in a 200° C. oven for 2 hours (7200 s). After cooling to room temperature, the casting was removed and physical properties obtained. The results were as follows:

$G_{1C} = 0.51$ $Tg = 180°$ C.

coefficient of thermal expansion below 100° C. was 65 ppm/°C.

EXAMPLE 2

A. VARNISH FORMULATION 2917 grams (9.944 equiv.) of a 75% solution of the trisepoxide employed in Example 1 in methyl ethyl ketone;
4048 grams (8.929 equiv.) of a 60% solution of TBBPA in methyl ethyl ketone;
3.3 grams of 2-methyl imidazole; and
200 grams of acetone.

The above mixture had a viscosity of 21 seconds measured in a No. 2 Zahn cup at 75° F.

B. PREPARATION OF PREIMPREGNATED SUBSTRATE

Burlington style 7628 glass cloth with an I617 finish was impregnated with the varnish formulation of Example 2-A in a forced air vertical treater having a total length of 26 feet (7.9 meters) with the first 19.5 feet (5.9 meters) heated to 350° F. at a rate of 12 feet per min. (61 mm/sec). The resin contained in the impregnated glass cloth had a 73 second gel time at 171° C. The resultant impregnated glass cloth had a resin content of 47% by weight.

C. PREPARATION OF LAMINATE

Both unclad (no copper) and one sided copper clad, 0.062" (1.57 mm) thick laminates were pressed from aforementioned prepreg. Eight 12 inch by 12 inch (304.8 cm×304.8 cm) plies were pressed into laminate form. The copper foil was a 1 ounce zinc oxide treated material. The laminates were pressed in a preheated Wabash press at 350° F. (176.7° C.) and 500 psi (34.47 kPa) for 1 hour (3600 s). There was no post-cure.

The unclad laminate had the following properties.
1. Tg=180° C.
2. Dynamic decomposition temperature was 314° C. (run at 3° C./min., 0.05° C./sec.).
3. Decomposition stability at 250° C. over a 60 min. (3600 s) period was excellent.
4. Z-axis coefficient of thermal expansion was 46.7 (ppm/°C. ($\phi_{1l}$)).
5. Maintained 95% of original storage modulus up to 157° C.
6. The relative moisture resistance was determined by placing 3 (2"×4") unclad laminate coupons in a pressure pot at 15 psi steam pressure for 2 hours (7200 s). After 2 hours (7200 s), the compounds were removed, externally dried and dipped in molten solder at 500° F. for 20 seconds. Each side of the 3 coupons was then inspected for any delamination blisters. The results were reported as No. of sides with no blisters divided by total No. of sides. This system had a perfect 6/6 or 100% passed.

The clad laminate had a copper peel strength of 4 to 4.8 lbs/in (71.4 to 85.7 g/mm).

EXAMPLE 3

A. VARNISH FORMULATION

A varnish formulation was prepared from the following.
2532 grams (8.833 equiv.) of a 75% solution of Epoxy Resin C in methyl ethyl ketone;
3808 grams (8.40 equiv.) of a 60% solution of TBBPA in methyl ethyl ketone;
8.55 grams of ethyltriphenylphosphonium acetate The above mixture had a viscosity of 20 seconds measured in a No. 2 Zahn cup at 75° F. (23.9° C.).

B. PREPARATION OF PREIMPREGNATED SUBSTRATE

Burlington style 7628 glass cloth with an I617 finish was impregnated with the varnish formulation of Example 3-A in a forced air vertical treater having a total length of 26 feet (7.9 meters) with the first 19.5 feet (5.9 meters) heated to 350° F. at a rate of 10 feet per min. (50.8 mm/sec). The resin contained in the impregnated glass cloth had a 97 second gel time at 171° C. The resultant impregnated glass cloth had a resin content of 44.4% by weight.

C. PREPARATION OF LAMINATE

Laminates, both unclad and one sided copper clad, were prepared in the same manner described in Example 2-C.

The unclad laminate had the following properties:
1. Tg=184° C.
2. the relative moisture resistance was determined in the same manner noted in Example 2, property no. 6. This system had a perfect 8/8 or 100% pass.

The clad laminate had a copper peel strength of 4.8 to 5.6 lbs/in (85.7 to 100 g/mm).

EXAMPLES 4-17

These examples were prepared in a manner similar to Example 1 employing the components and conditions of the following Table I. The properties of the resultant product are also given in the Table I.

Also, methyl-p-toluene sulfonate was added to portions of the solution to determine its effects to the stability of the resin system. The results are given in Table II.

TABLE II

| Time | % Epoxide |
|---|---|
| STABILITY AT 25° C. (NO STABILIZER) | |
| 0 | 6.3 |
| 2 days (172,800 s) | 6.2 |
| 27 days (2,332,800 s) | 6.0 |
| 90 days (7,776,000 s) | 5.6 |
| STABILITY AT 50° C. (NO STABILIZER) | |
| 0 | 6.3 |
| 2 days (172,800 s) | 6.1 |
| 27 days (2,332,800 s) | 4.8 |
| 90 days (7,776,000 s) | Gelled |
| STABILITY AT 50° C. (WITH STABILIZER*) | |
| 0 | 6.3 |
| 2 days (172,800 s) | 6.2 |
| 27 days (2,332,800 s) | 6.1 |
| 90 days (7,776,000 s) | 5.6 |
| 240 days (20,736,000 s) | 4.9 |

TABLE I

| COMPONENTS, CONDITIONS AND RESULTS | EXAMPLE 4 | EXAMPLE 5 | EXAMPLE 6 | EXAMPLE 7 | EXAMPLE 8 | EXAMPLE 9 |
|---|---|---|---|---|---|---|
| Epoxy Resin, type/grams/equiv. | D/5.013/0.0246 | D/5.050/0.0248 | B/7.482/0.462 | E/5.447/0.0288 | F/5.819/0.0315 | G/5.176/0.0273 |
| Tetrabromobisphenol A, grams/equiv. | 6.682/0.0246 | 6.733/0.0248 | 12.562/0.0462 | 6.204/0.0228 | 8.574/0.0315 | 7.433/0.0273 |
| Catalyst, type/grams | BDMA[1]/0.015 | None | BDMA/0.22 | BDMA/0.016 | BDMA/0.017 | BDMA/0.015 |
| Mixing Conditions, C/sec. | 175/120 | 175/120 | 175/120 | 175/120 | 175/120 | 175/120 |
| Curing Conditions[3], C/sec. | 180/3600 225/9000 | 180/3600 225/9000 | 180/3600 225/9000 | 180/3600 225/9000 | 180/3600 225/9000 | 180/3600 225/9000 |
| Tg, C | 189.4 | 175 | 178 | 178 | 180 | 191 |

| COMPONENTS, CONDITIONS AND RESULTS | EXAMPLE 10 | EXAMPLE 11 | EXAMPLE 12 | EXAMPLE 13 | EXAMPLE 14 | EXAMPLE 15 |
|---|---|---|---|---|---|---|
| Epoxy Resin, type/grams/equiv. | H/6.178/0.0347 | I/5.384/0.0265 | J/5.039/0.0177 | K/5.490/0.0298 | L/5.595/0.0265 | M/5.359/0.0254 |
| Tetrabromobisphenol A, grams/equiv. | 9.441/0.0347 | 7.214/0.0265 | 4.807/0.0177 | 8.114/0.0298 | 7.206/0.0265 | 6.897/0.0254 |
| Catalyst, type/grams | BDMA/0.019 | BDMA/0.016 | BDMA/0.015 | BDMA/0.016 | BDMA/0.017 | BDMA/0.017 |
| Mixing Conditions, C/sec. | 175/120 | 175/120 | 175/120 | 175/120 | 175/120 | 175/120 |
| Curing Conditions[3], C/sec. | 180/3600 225/9000 | 180/3600 225/9000 | 180/3600 225/9000 | 180/3600 225/9000 | 180/3600 225/9000 | 180/3600 225/9000 |
| Tg, C | 153 | 160 | 178 | 183 | 161 | 166 |

| COMPONENTS, CONDITIONS AND RESULTS | EXAMPLE 16 | EXAMPLE 17 |
|---|---|---|
| Epoxy Resin, type/grams/equiv. | N/4.970/0.0236 | O/5.045/0.0218 |
| Tetrabromobisphenol A, grams/equiv. | 5.943/0.0218 | 5.938/0.0218 |
| Catalyst, type/grams | TBPA[2]/0.22 | BDMA/0.015 |
| Mixing Conditions, C/sec. | 175/120 | 175/120 |
| Curing Conditions[3], C/sec. | 180/3600 225/9000 | 180/3600 225/9000 |
| Tg, C | 178 | 184 |

[1]BDMA is benzyldimethylamine (10% solution in methanol)
[2]TBPA is a 70% solution of tetrabutylphosphonium acetate.acetic acid complex in methanol
[3]After mixing, the clear resin system was poured into a small aluminum mold for curing

EXAMPLE 18

A formulation was made consisting of 100 g (0.4545 equiv.) of Epoxy Resin A, 114 g (0.41829 equiv.) of tetrabromobisphenol A and 110 g of methyl ethyl ketone. The resin solution was studied to determine its stability at 25° C. and at 50° C. The stability was related to changes in the percent epoxide over a period of time.

*0.1 g of methyl-p-toluene sulfonate was added to 40 g of resin solution

We claim:
1. A composition comprising
(A) at least one of

(1) at least one epoxy resin represented by the following formulas I, II, III, IV, V or VI FORMULA I
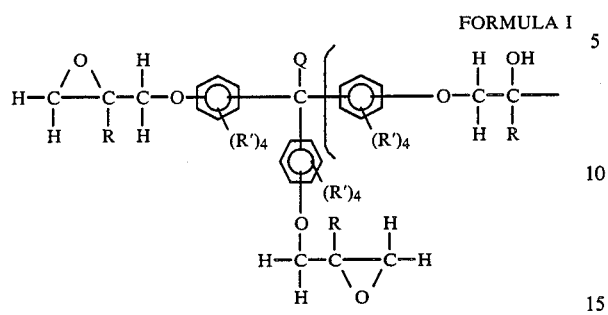

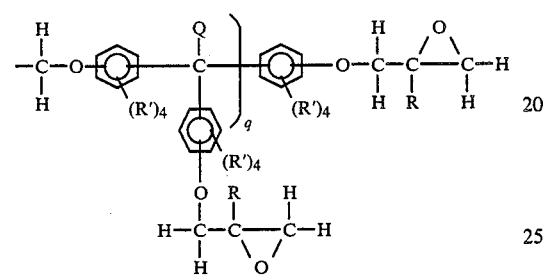

FORMULA II
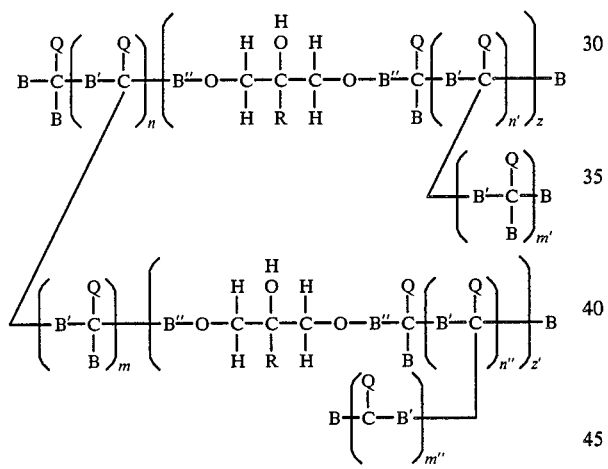

FORMULA III
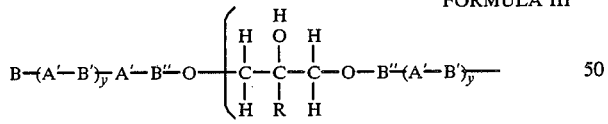

FORMULA IV
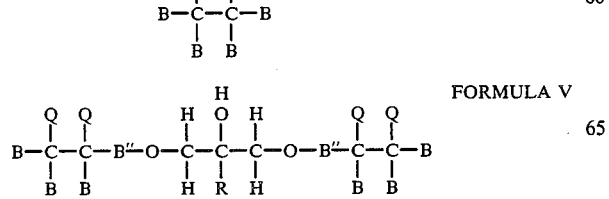

FORMULA V

FORMULA VI
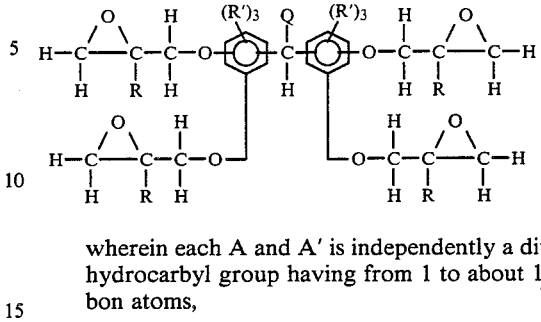

wherein each A and A' is independently a divalent hydrocarbyl group having from 1 to about 12 carbon atoms,

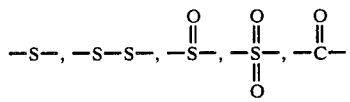

or —O—; each B is represented by the formula

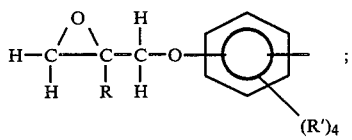

each B' is represented by the formula

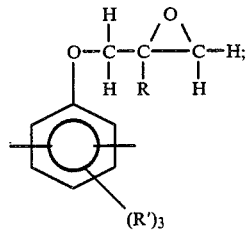

each B'' is represented by the formula

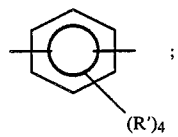

each R is independently hydrogen or an alkyl group having from 1 to about 4 carbon atoms; each Q is independently hydrogen or a hydrocarbyl group having from 1 to about 10 carbon atoms; each R' is independently hydrogen, a hydrocarbyl or hydrocarbyloxy group having from 1 to about 10 carbon atoms or a halogen; m has a value of $n-1$; m' has a value of $n'-1$; m'' has a value of $n''-1$; each n, n' and n'' independently has a value from zero to about 3; q has a value from zero to about 4; each y independently has an average value from 1 to about 5; y' has an average value of from zero to about 3 and each z and z' independently has a value from zero to about 3;

(2) the reaction product of
(a) at least one epoxy resin as defined in component (A-1) and (b) at least one dihydric phenol represented by the following formulats VII or VIII

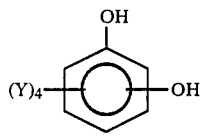
FORMULA VII

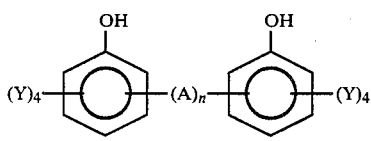
FORMULA VIII wherein A is as defined above; each y is independently hydrogen, a halogen or a hydrocarbyl or hydrocarbyloxy group having from 1 to about 10 carbon atoms; and n has a value of zero or 1; and wherein components (A-2-a) and (A-2-b) are present in quantities such that the ratio of phenolic hydroxyl groups to epoxide groups is from about 0.01:1 to about 0.5:1; or (3) mixtures thereof;
(b) at least one halogenated dihydric phenol represented by the following formulas IX or X

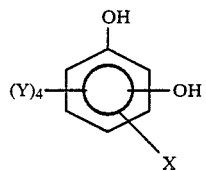
FORMULA IX

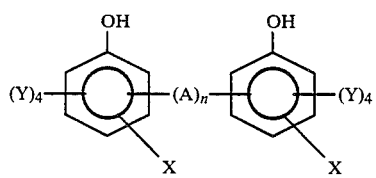
FORMULA X wherein A, Y and n are as defined above; each X is a halogen; and
wherein components (A) and (b) are present in quantities such that the ratio of phenolic hydroxyl groups to epoxide groups is from about 0.7:1 to about 1.1:1.

2. A composition of claim 1 wherein components (A) and (B) are present in quantities such that the ratio of phenolic hydroxyl groups to epoxide groups is from about 0.85:1 to about 1:1 and a stabilizing quantity of a stabilizer represented by the formula

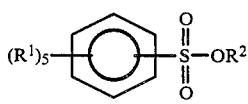

wherein each $R^1$ is independently hydrogen, a hydrocarbyl group having from 1 to about 10 carbon atoms or a halogen, and $R^2$ is a hydrocarbyl group having from 1 to about 10 carbon atoms.

3. A composition of claim 2 wherein components (A) and (B) are present in quantities such that the ratio of phenolic hydroxyl groups to epoxide groups is from 0.9:1 to about 0.95:1 and said stabilizer is present in an amount of from about 0.001 to about 10 percent by weight of the weight of component (A).

4. A composition of claim 1 wherein component (A) is component (A-1) represented by formula I or II wherein Q, R and R' is hydrogen; q has an average value of from about 0.1 to about 2 and component (B) is represented by formula X wherein A is a divalent hydrocarbyl group having from 1 to about 6 carbon atoms, each X is bromine and n has a value of 1.

5. A composition of claim 4 wherein in component (A-1) q has an average value of from about 0.5 to about 1.5; component (B) is tetrabromobisphenol A and said stabilizer is methyl p-toluene sulfonate.

6. A composition of claim 2 wherein component (A) is component (A-1) represented by formula I or II wherein Q, R and R' is hydrogen; q has an average value of from about 0.1 to about 2 and component (B) is represented by formula X wherein A is a divalent hydrocarbyl group having from 1 to about 6 carbon atoms; each X is bromine and n has a value of 1.

7. A composition of claim 6 wherein in component (A-1) q has an average value of from about 0.5 to about 1.5 and component (B) is tetrabromobisphenol A and said stabilizer is methyl p-toluene sulfonate.

8. A composition of claim 3 wherein component (A) is component (A-1) represented by formula I or II wherein Q, R and R' is hydrogen; m has an average value of from about 0.1 to about 2 and component (B) is represented by formula X wherein A is a divalent hydrocarbyl group having from 1 to about 6 carbon atoms; each X is bromine and n has a value of 1.

9. A composition of claim 8 wherein in component (A-1) q has an average value of from about 0.5 to about 1.5 and component (B) is tetrabromobisphenol A and said stabilizer is methyl p-toluene sulfonate.

10. A composition of claim 1 wherein component (A) is component (A-1) represented by formula III wherein A' has from 1 to about 4 carbon atoms and each R and R' is hydrogen and component (B) is represented by formula X wherein A is a divalent hydrocarbyl group having from 1 to about 6 carbon atoms; each X is bromine and n has a value of 1.

11. A composition of claim 10 wherein component (B) is tetrabromobisphenol A.

12. A composition of claim 2 wherein component (A) is component (A-1) represented by formula III wherein A' has from 1 to about 4 carbon atoms and each R and R' is hydrogen and component (B) is represented by formula X wherein A is a divalent hydrocarbyl group having from 1 to about 6 carbon atoms; each X is bromine and n has a value of 1.

13. A composition of claim 12 wherein component (B) is tetrabromobisphenol A and said stabilizer is methyl p-toluene sulfonate.

14. A composition of claim 3 wherein component (A) is component (A-1) represented by formula III wherein A' has from 1 to about 4 carbon atoms and each R and R' is hydrogen and component (B) is represented by formula X wherein A is a divalent hydrocarbyl group having from 1 to about 6 carbon atoms; each X is bromine and n has a value of 1.

15. A composition of claim 14 wherein component (B) is tetrabromobisphenol A and said stabilizer is methyl p-toluene sulfonate.

16. A composition of claim 1 wherein component (A) is component (A-1) represented by formula IV wherein each Q, R and R' is hydrogen and component (B) is represented by formula X wherein A is a divalent hydrocarbyl group having from 1 to about 6 carbon atoms; each X is bromine and n has a value of 1.

17. A composition of claim 16 wherein component (B) is tetrabromobisphenol A.

18. A composition of claim 2 wherein component (A) is component (A-1) represented by formula IV wherein each Q, R and R' is hydrogen and component (B) is represented by formula X wherein A is a divalent hydrocarbyl group having from 1 to about 6 carbon atoms; each X is bromine and n has a value of 1.

19. A composition of claim 18 wherein component (B) is tetrabromobisphenol A and said stabilizer is methyl p-toluene sulfonate.

20. A composition of claim 3 wherein component (A) is component (A-1) represented by formula IV wherein each Q, R and R' is hydrogen and component (B) is represented by formula X wherein A is a divalent hydrocarbyl group having from 1 to about 6 carbon atoms; each X is bromine and n has a value of 1.

21. A composition of claim 20 wherein component (B) is tetrabromobisphenol A and said stabilizer is methyl p-toluene sulfonate.

22. A composition of claim 1 wherein component (A) is component (A-1) represented by formula V wherein each Q, R and R' is hydrogen and component (B) is represented by formula X wherein A is a divalent hydrocarbyl group having from 1 to about 6 carbon atoms; each X is bromine and n has a value of 1.

23. A composition of claim 22 wherein component (B) is tetrabromobisphenol A.

24. A composition of claim 2 wherein component (A) is component (A-1) represented by formula V wherein each Q, R and R' is hydrogen and component (B) is represented by formula X wherein A is a divalent hydrocarbyl group having from 1 to about 6 carbon atoms; each X is bromine and n has a value of 1.

25. A composition of claim 24 wherein component (B) is tetrabromobisphenol A and said stabilizer is methyl p-toluene sulfonate.

26. A composition of claim 3 wherein component (A) is component (A-1) represented by formula V wherein each Q, R and R' is hydrogen and component (B) is represented by formula X wherein A is a divalent hydrocarbyl group having from 1 to about 6 carbon atoms; each X is bromine and n has a value of 1.

27. A composition of claim 26 wherein component (B) is tetrabromobisphenol A and said stabilizer is methyl p-toluene sulfonate.

28. A composition of claim 1 wherein component (A) is component (A-1) represented by formula VI wherein each Q and R' is hydrogen and component (B) is represented by formula X wherein A is a divalent hydrocarbyl group having from 1 to about 6 carbon atoms; each X is bromine and n has a value of 1.

29. A composition of claim 28 wherein component (B) is tetrabromobisphenol A.

30. A composition of claim 2 wherein component (A) is component (A-1) represented by formula VI wherein each Q and R' is hydrogen and component (B) is represented by formula X wherein A is a divalent hydrocarbyl group having from 1 to about 6 carbon atoms; each X is bromine and n has a value of 1.

31. A composition of claim 30 wherein component (B) is tetrabromobisphenol A and said stabilizer is methyl p-toluene sulfonate.

32. A composition of claim 3 wherein component (A) is component (A-1) represented by formula VI wherein each Q and R' is hydrogen and component (B) is represented by formula X wherein A is a divalent hydrocarbyl group having from 1 to about 6 carbon atoms; each X is bromine and n has a value of 1.

33. A composition of claim 32 wherein component (B) is tetrabromobisphenol A and said stabilizer is methyl p-toluene sulfonate.

34. A composition which comprises (I) a composition of claims 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33 and (II) a catalytic quantity of at least one catalyst for effecting the reaction between components (I-A) and (I-B).

35. A composition of claim 34 wherein said catalyst is a phosphonium compound, an imidazole, a tertiary amine or a combination thereof.

36. A composition of claim 35 wherein said catalyst is ethyltriphenylphosphonium acetate.acetic acid complex, 2-methyl imidazole, 2-ethyl-4-methyl imidazole, benzyldimethyl amine or a combination thereof.

37. A substrate impregnated with a composition of claim 34.

38. A substrate impregnated with a composition of claim 35.

39. A substrate impregnated with a composition of claim 36.

40. An electrical or structural laminate or composite containing one or more layers of a cured impregnated substrate or combination of substrates of claim 37.

41. An electrical laminate of claim 40 having at least one external layer of an electrical conductive material.

42. An electrical laminate of claim 41 wherein said electrically conductive material is copper.

43. An electrical or structural laminate or composite containing one or more layers of a cured impregnated substrate or combination of substrates of claim 38.

44. An electrical laminate of claim 43 having at least one external layer of an electrical conductive material.

45. An electrical laminate of claim 44 wherein said electrically conductive material is copper.

46. An electrical or structural laminate or composite containing one or more layers of a cured impregnated substrate or combination of substrates of claim 39.

47. An electrical laminate of claim 46 having at least one external layer of an electrical conductive material.

48. An electrical laminate of claim 47 wherein said electrically conductive material is copper.

* * * * *

UNITED STATES PATENT AND TRADEMARK OFFICE
CERTIFICATE OF CORRECTION

PATENT NO. : 4,604,317
DATED : August 5, 1986
INVENTOR(S) : Jody R. Berman, Christine C. Berkefelt and Dale J. Aldrich It is certified that error appears in the above-identified patent and that said Letters Patent is hereby corrected as shown below:

Col. 3, line 21; insert --each-- before "B' ".

Col. 9, line 33; change "tetrabromobispheno" to --tetrabromobisphenol--.

Col. 10, line 31; change "($\phi_{1})$)" to --($\alpha_{1}$))--.

Col. 13, lines 45-46, Formula II, Claim 1; insert a single bond --'-- and --B-- below the "C".

Col. 15, line 2, Claim 1; change "formulats" to --formulas--.

Col. 15, line 16, Claim 1; change "y" to --Y--.

Col. 15, line 32, Formula IX, Claim 1; change "$(Y)_{4}$" to --$(Y)_{3}$--.

Col. 15, line 39, Formula X, Claim 1; change both occurrences of "$(Y)_{4}$" to --$(Y)_{3}$--.

Col. 15, line 46, Claim 1; change "(b)" to --(B)--.

Signed and Sealed this

Second Day of February, 1988

Attest:

DONALD J. QUIGG

Attesting Officer

Commissioner of Patents and Trademarks